3,061,236
BEAD BUILDING APPARATUS
Ernest U. Lang, Niles, Mich., assignor to National-Standard Company, Niles, Mich., a corporation of Delaware
Filed Nov. 24, 1958, Ser. No. 775,750
11 Claims. (Cl. 242—158.4)

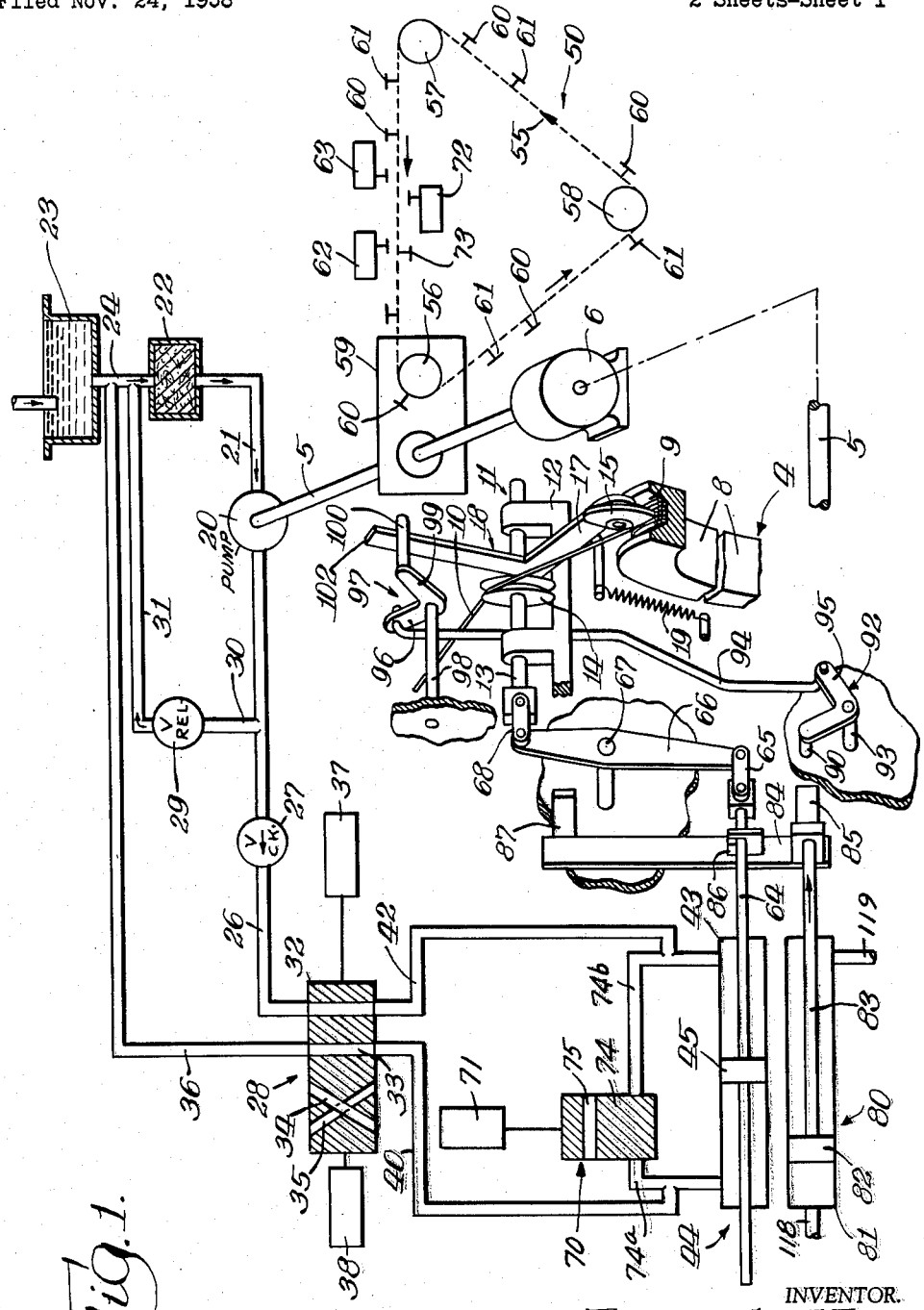

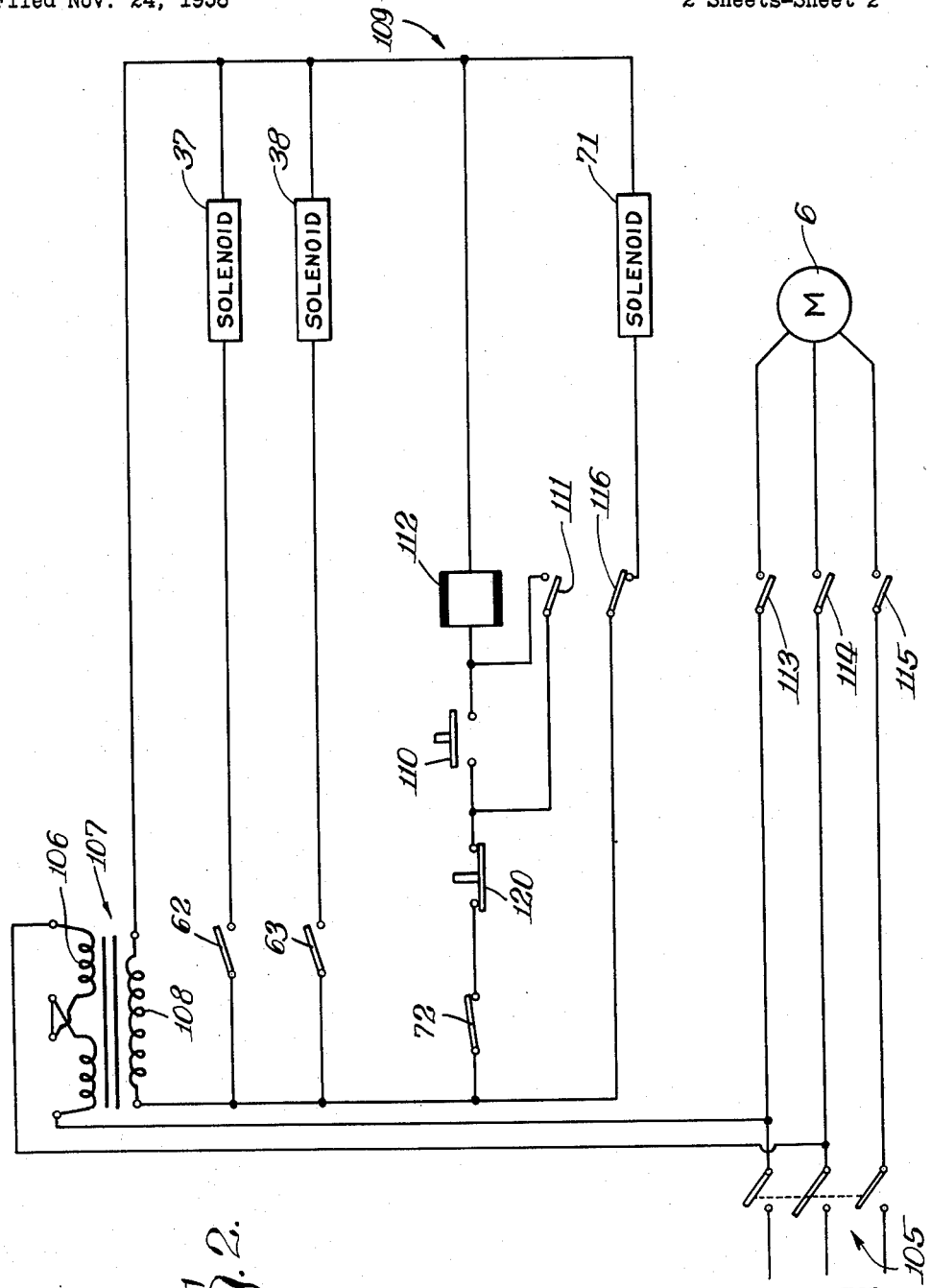

My present invention relates to tire bead building machines, and more particularly to apparatus for controlling level wind or traverse mechanism for the winding of tire bead material on the former of a tire bead building machine.

It is conventional in the art in tire bead building machines to provide a former which is adapted to be rotated to wind tire bead material thereon to form a tire bead. My present invention is concerned with apparatus of the character noted, and it is an important object of my invention to provide, in such apparatus, level wind or traverse means operative to effect laying of bead material, preferably of insulated or rubber coated wire form, about a former so as to provide a tire bead comprising a plurality of superposed layers of bead material, and in which the successive turns of bead material in each layer are disposed in predetermined side by side relation.

It is a further object of my invention to provide an apparatus as aforesaid for building a tire bead in which the successive layers of bead material may comprise different numbers of turns of tire bead material.

A further object of my invention is to provide an apparatus adapted upon completion of the wrapping of tire bead material for a tire bead on the former for positioning the level wind or traverse means in a predetermined desired starting position for forming the next tire bead on the former.

In order to achieve the aforementioned objects I preferably utilize a driven former having a groove extending radially inwardly of the periphery thereof and of a cross-sectional configuration compatible with the cross-sectional shape desired for the tire bead to be built thereon. Level wind or traverse means is provided for guiding or laying insulated tire bead wire into the groove of the former, and means operative in timed relation with rotation of the former is utilized to control motor means for effecting reciprocation of the level wind or traverse mechanism transversely of the groove in the former to lay the tire bead material in successive abutting turns in each layer, and to control the extent of traverse of the level wind or traverse mechanism to lay the desired number of turns of tire bead material in each layer. The apparatus of my invention thus affords for the fabricating of tire beads of any desired cross-sectional configuration as determined by the number of turns of wire in each layer. Further, the apparatus of my invention includes positioning means operative upon completion of a tire bead to locate or reorient the level wind or traverse mechanism in position to lay properly the first turn of tire bead material for the next tire bead to be built on the former.

In the preferred embodiment of my invention herein disclosed, a variable volume fluid pump is caused to be driven together with the former as by an electric motor to deliver fluid under pressure through suitable valve means to motor means in the form of a piston and cylinder assembly. The fluid under pressure is admitted, selectively, to the cylinder at opposite ends of the piston and its movement is utilized to reciprocate the level wind or traverse mechanism. Actuation of the aforementioned valve means is preferably accomplished by means of control means including microswitches which are adapted to be engaged by lugs or switch engaging members carried on a chain of timing means driven in timed relation with the former shaft, to provide for predetermined extent of reciprocating movement of the level wind means. Upon completion of a tire bead second control means which also includes a microswitch adapted to be engaged by a lug or switch engaging member carried by the chain of the timing means, effects deenergization of the electric motor for the apparatus and terminates driving of the variable volume fluid pump and the former, and further provides for bypassing of fluid in the cylinder of the motor means from one end to the other end thereof to permit reorientation of the level wind or traverse mechanism to appropriate starting position for building a succeeding tire bead on the former. The reorientation of the level wind or traverse mechanism is preferably accomplished by positioning means which may be in the form of an air piston and cylinder and, which, when actuated, locates or reorients the level wind or traverse mechanism to the desired starting position.

The above and other objects and advantages of my invention will appear from the detail description.

Now in order to acquaint those skilled in the art with the manner of constructing and utilizing an apparatus in accordance with my invention I shall describe in connection with accompanying drawing, a preferred embodiment of my invention.

In the drawings:
FIGURE 1 is a diagrammatic illustration of apparatus embodying my invention; and
FIGURE 2 is a schematic wiring diagram of an electric circuit suitable for controlling the apparatus schematically illustrated in FIGURE 1.

In the drawing a portion of a tire bead former 4 is shown. As is known the former is keyed to a former shaft 5 which may be driven by any suitable power source such as electric motor 6. In the instant embodiment of my invention herein disclosed, the former may comprise a plurality of former segments 8 having grooves in the outer peripheries thereof, which are adapted when the segments are in their bead forming positions to define a substantially annular V-shaped groove 9, which as will be described, has utility for forming tire beads of substantially hexagonal cross-sectional configuration. It will be understood, however, that formers of other constructions and shapes may be utilized with my invention.

Tire bead material 10, such as known insulated or rubber coated wire, is adapted to be layed in the V-shaped groove 9 in a plurality of superposed layers and in which the successive turns of bead material in each layer are disposed in predetermined and preferably side by side abutting relation, through known wire laying mechanism indicated generally at 11. The mechanism 11 comprises a stationary frame 12 supporting a shaft 13 for reciprocation therein, and which shaft 13 carries a guide wheel 14 over which the bead material is trained and leads to a laying wheel 15 carried at the outer end of arm 17 of a bell crank 18 mounted on shaft 13. The bell crank 18 may be conventionally spring biased as by spring 19 in a direction urging wheel 15 inwardly of groove 9 to effect appropriate laying of bead material 10. It will be observed that as shaft 13 is reciprocated axially, i.e. transversely of the V-shaped groove 9, that the tire bead material 10 is layed in successive layers as aforementioned in the V-shaped groove 9.

The former shaft 5 as diagrammatically shown, has driving connection with a variable volume pump 20, the inlet of which has connection by a conduit 21 with a filter 22 which receives fluid from reservoir 23 through conduit 24. Fluid under pressure developed by pump 20 is discharged through outlet or fluid delivery conduit 26, which is provided with a one way ball check valve 27 to prevent back flow of fluid, to control means 28 which in the embodiment of my invention disclosed herein is in the form of a four way valve. In the event fluid under excessive pressure is delivered by the pump 20, there is provided a pressure relief valve 29 through which such fluid may flow from discharge conduit 26 through conduit 30, valve 29, and conduit 31 to conduit 24 extending between the filter 22 and reservoir 23.

The control means afforded by four way valve 28, as shown, comprises a first set of inlet and exhaust passageways 32 and 33, respectively, and a second set of inlet and exhaust passageways 34 and 35, respectively. A return line 36 extends from the four way valve 28 to conduit 24 between the reservoir 23 and filter 22. A pair of electrically operable solenoids 37 and 38 may be conveniently associated with the four way valve 28, and in which solenoid 37, when energized and solenoid 38 de-energized, actuates valve 28, as shown in FIG. 1, to dispose the inlet and exhaust passageways 32 and 33 in communication with conduits 26 and 36, respectively, and in which solenoid 38, when energized, and solenoid 37 de-energized, connects inlet and exhaust passageways 34 and 35 with conduits 26 and 36, respectively, and disconnects passageways 32 and 33 from conduits 26 and 36, respectively. A pair of fluid conduits 40 and 42 extend from the four way valve 28 to opposite ends of a cylinder 43 of a piston and cylinder assembly indicated generally at 44 affording motor means for reciprocating shaft 13 of the level wind or traverse mechanism 11 in a manner to be described. As shown, conduit 42 extends to the cylinder 43 opposite one end of the piston 45 within cylinder 43, and conduit 40 extends to the cylinder 43 opposite the other end of the piston 45. Thus in the position of four-way valve 28, as shown in FIGURE 1 fluid under pressure delivered by the pump 20 passes through conduit 26, inlet passageway 32 of the four way valve 28, through conduit 42 and into the right hand end of cylinder 43 to urge the piston 45 to the left as viewed in FIGURE 1. At the same time fluid in the cylinder 43 at the left hand end of piston 45 passes through conduit 40, exhaust passageway 33 of valve 28 and through return conduit 36 to conduit 24 between reservoir 23 and filter 22. Under the conditions noted, the piston 45 is being moved to the left as viewed in FIGURE 1. With solenoid 37 de-energized and solenoid 38 energized, the inlet and exhaust passageways 32 and 33 will be disconnected from conduits 26 and 42, and conduits 36 and 40, respectively, and inlet and exhaust passageways 34 and 35 will be established in communication with conduits 26 and 40, and 36 and 42, respectively, whereupon fluid under pressure from the discharge outlet of pump 20 passes through conduit 26, inlet passageway 34 of four way valve 28, through conduit 40 to the cylinder 43 at the left hand end of piston 45, and fluid in the cylinder to the right of piston 45 as viewed in the drawing is exhausted through conduit 42, exhaust passageway 35, and return conduit 36 to conduit 24 between filter 22 and reservoir 23. In the position of parts as last noted, the piston 45 is moved to the right in cylinder 43 as viewed in FIGURE 1. Thus, upon the selective energization and deenergization of solenoids 37 and 38, fluid under pressure from the pump may be delivered to the cylinder 43 either to the left or right hand ends of piston 45 as viewed in FIGURE 1 to reciprocate the piston 45.

The circuit means providing for the selective energization and deenergization of solenoids 37 and 38 will be described below in connection with FIGURE 2 and for the present it will be noted that mechanical switching is achieved by means of timing means 50 comprising an endless chain 55 trained about a series of gears 56, 57 and 58 arranged with their apices at the corners of a triangle. The gear 56 is driven by electric motor 6 through a speed reducer 59 in predetermined timed relation with rotation of former shaft 5. The chain 55 carries a plurality of lugs or switch actuating members 60 and 61 which are alternately laterally offset to trip, respectively, laterally offset microswitches 62 and 63, which together with valve 28 define control means for the motor means afforded by piston and cylinder assembly 44. Microswitch 62 as will be described is electrically connected with and controls energization and deenergization of solenoid 37, and microswitch 63 also as below described is electrically connected with solenoid 38 to effect its selective energization and deenergization to afford for reciprocation of piston 45 in cylinder 43. The chain 55 is driven in timed relation with the former shaft 5 and the several lugs or switch actuating members 60 and 61 are arranged in predetermined spaced relation on the chain to afford the desired extent of reciprocation of the piston 45. The piston 45 has a piston rod 64 secured at one end thereto and the opposite or outer end of the piston rod has pivotal connection via link 65 with one end of a crank arm 66, pivoted at 67, and having pivotal connection at its other end through link 68 with shaft 13 of level wind mechanism 11. Thus the extent of reciprocating movement of piston 45 in cylinder 43 affords for the laying of tire bead material in V-shaped groove 9 of the former. In the particular former shown, the first layer of bead material may comprise a desired given number of turns of wire and the successive layers include increasing numbers of turns of wire so that within the groove 9 a bead of half-hexagonal cross-sectional configuration may be formed. Reciprocation of shaft 13 may then be suitably controlled so as to complete the second half portion of the bead with the outermost layer including the same number of turns of wire as first layed in the V-shaped groove. Of course, any desired pattern may be readily achieved by appropriately locating lugs or switch actuating members 60 and 61 on chain 55, which since it is driven in timed relation with former shaft 5 will afford the laying of any predetermined number of turns of wire in any layer of the bead. It is, of course, desirable that the groove for the former be compatible with the traverse pattern of the level wind mechanism. Also, the pump 20 is calibrated to provide a predetermined output volume of fluid dependent upon the diameter of the tire bead material so that each layer of the bead comprises a predetermined number of wires disposed preferably in side by side abutting relation.

Upon completion of a tire bead rotation of former 4 and pump 20 is terminated. The bead supply material is severed and former 4 is then collapsed and the finished bead is removed. Upon termination of rotation of former 4 a second or bypass control means 70 is rendered operative. At this point it is sufficient to note that bypass control means 70 preferably comprises a solenoid 71 electrically connected with a microswitch 72 adapted to be actuated by lug or switch actuating member 73 carried by the chain 55 of the timing means 50. In the arrangement shown, there is but a single lug 73 which is adapted to effect termination of drive to former 4 and pump 20 at the end of a complete revolution of the chain and to provide for energization of solenoid 71 to actuate a bypass valve 74. As shown in FIGURE 1, a conduit 74a connects conduit 40 with by-pass valve 74 and a conduit 74b connects conduit 42 with the valve 74. In the position of parts shown in the drawing, by-pass valve disconnects conduits 74a and 74b so that the conduits 40 and 42 communicate with opposite ends of cylinder 43 as first described to effect reciprocation of piston 45 in the cylinder 43. Upon energization of solenoid 71 passageway 75 of bypass valve means 70 connects conduits 74a and 74b with each other so that the ends of cylinder 43 are placed in communication with each other and fluid in cylinder 43 is adapted to freely pass from one end to the other end thereof on movement of piston 45 in cylinder 43 to enable, as will now be described, reorienting of the level wind or traverse mechanism 11 to correct starting position for the forming of a succeeding bead on the former.

The reorienting or positioning mechanism is indicated generally at 80 and preferably comprises an air cylinder 81 having a piston 82 mounted for reciprocation therein. Air is adapted to be admitted by manual actuation of a valve, not shown, through a conduit 118 from a source, not shown, to the cylinder 81 at the left hand end of piston 82 in the position of the parts shown in FIGURE 1 to effect movement of piston rod 83 to the right. In such operation air in cylinder 81 to the right of piston 82 is exhausted through a conduit 119 at the right-hand end of cylinder 81. The piston rod 83 at its outer end carries a bracket 84 having a plurality of abutment members 85, 86 and 87. In such movement of bracket 84, the abutment member 86 through link 65 and abutment member 87 apply aligning force to crank arm 66 on opposite sides its pivot 67 and thus disposes shaft 13 in a predetermined starting position for laying of tire bead material in the groove of the former for the building of a bead. The piston rod 83 and shaft 13 of level wind mechanism 11 as shown, are mounted for parallel reciprocating movement and the links 65 and 68 previously described permit alignment of crank arm 66 as aforedescribed. In actuation of positioning means 80, it will additionally be seen that abutment 85 is adapted to engage a pin 90 of a bell crank lever 92 pivotally mounted on fixed pivot 93 to rotate the bell crank lever 92 in a clockwise direction as viewed in the drawing. A rod 94 extends from the outer end of arm 95 of the bell crank lever to the end of arm 96 of a second bell crank 97 mounted on a fixed pivot shaft 98. The other arm 99 of the bell crank 97 carries a pin 100 which as shown is adapted to engage arm 102 of bell crank lever 18 secured to level wind shaft 13. The arrangement is such that upon actuation of the reorienting or positioning means 80 as above described, bell crank 97 is rocked to engage arm 102 of bell crank 18 to lift the laying wheel 15 prior to axial movement of level wind shaft 13 in effecting the positioning of the shaft to starting position for building a bead. Before building a new bead air may be admitted through conduit 119 and exhausted through conduit 118 to condition the positioning means 80 for a subsequent operation as above described.

Thus, when solenoid 71 of the bypass control means 70 is energized, piston 45 and rod 64 of motor means 44 are freely movable and fluid displaced in cylinder 43 readily moves from one end to the other end thereof through conduit 75.

It will be observed that in the apparatus above described that the chain 55 makes one complete revolution in the constructing of a bead. In the arrangement shown, the chain preferably travels a distance of one link for each revolution of the former to afford for the ready and convenient positioning of the lug or switch actuators 60 and 61 so as to provide any desired number of turns of wire in each of the superposed layers of the completed tire bead. At the termination of one complete revolution of chain 55 lug or switch actuating member 73 then engages microswitch 72 to stop the bead machine. Also, as above mentioned, the pump 20 is preferably of the variable volume type so that its output may be regulated depending on the diameter of the bead material to assure that successive turns of bead material in each layer are wrapped about the former in abutting relation.

Referring now to FIGURE 2 I have shown a typical electric circuit suitable for controlling actuation of the above apparatus in the manner described. As shown, the motor 6 is adapted to have connection with an electrical power input supply illustrated generally at 105. The input supply 105 has conventional connection with the primary 106 of a transformer illustrated at 107 and the secondary 108 of the transformer affords an electrical source for the secondary circuit 109. It will be observed that a starting switch 110 is suitably embodied in the secondary circuit 109 for closing holding contacts 111 of a conventional motor contactor including a relay 112. Closing of starting switch 110 affords energization of relay 112 to close contacts 113, 114 and 115 of the motor contactor to connect the motor 6 in circuit with the power supply 105. The secondary circuit also includes the microswitches 62 and 63, which as shown are normally opened and are adapted to be momentarily closed by the aforedescribed lug or switch actuated members 60 and 61, respectively, to effect alternate energization of solenoids 37 and 38 of the apparatus of FIGURE 1 to control the four way valve and provide for reciprocation of the level wind or traverse mechanism 11 as above described. The secondary circuit 109 also includes contacts 116 of relay 112 and upon a complete revolution of timing chain 55, switch actuator 73 opens normally closed microswitch 72 in series with relay 112 to interrupt the circuit between motor 6 and the power supply thus opening holding contacts 111 and contacts 113, 114 and 115 and close contacts 116 to complete the secondary circuit 109 through the bypass solenoid 71 which, as previously described, provides for the bypassing of fluid from one end to the other end of cylinder 43 of the motor 44 which then conditions the apparatus for the actuation of positioning means 80 to reorient the level wind mechanism 11 to a position relative to the former to begin building of a bead thereon. A stop switch 120 may be incorporated in the circuit of relay 112 so that the operator may terminate operation of the apparatus if desired or necessary.

While I have shown and described what I consider to be a preferred embodiment of my invention it will be unedstood that various modifications and rearrangements may be made therein without departing from the spirit and scope of my invention.

I claim:

1. In tire bead building apparatus including a rotatable former and level wind means for laying tire bead material in successive turns transversely on said former, the combination of motor means affording a reciprocating drive output having connection with said level wind means for reciprocating the latter transversely of said former, control means having connection with said motor means for controlling the direction of the drive output thereof, timing means connected with said former and operative in predetermined timed relation with rotation of the latter for actuating said control means to provide for the predetermined reciprocation of said level wind means transversely of said former, means for driving said former and said timing means, second control means connected with said motor means and adapted when actuated to render said motor means inoperative, and said timing means including means for actuating said second control means.

2. In tire bead building apparatus including a rotatable former and level wind means for laying tire bead material in successive turns transversely on said former, the combination of motor means affording a reciprocating drive output having connection with said level wind means for reciprocating the latter transversely of said former, control means having connection with said motor means for controlling the direction of the drive output thereof, timing means connected with said former and operative in predetermined timed relation with rotation of the latter for actuating said control means to provide for the predetermined reciprocation of said level wind means transversely of said former, means for driving said former and said timing means, second control means connected with said motor means and adapted when actuated to render said motor means inoperative, said timing means including means for actuating said second control means and thereby terminate reciprocation of said level wind means by said motor means, and positioning means mounted adjacent said level wind means for engaging and positioning the latter in a predetermined position relative to said former after actuation of said second control means.

3. In tire bead building apparatus including a rotatable former and level wind means for laying tire bead material in successive turns transversely on said former, the combination of pump means affording a source of fluid under pressure, motor means including a piston and cylinder, said piston having connection with said level wind means for reciprocating the latter transversely of said former, valve means between said pump means and said cylinder for selectively controlling flow of fluid under pressure from said pump means to said cylinder at opposite ends of said piston, timing means including a member connected to and driven with said former and operative in predetermined timed relation with rotation of the latter for controlling said valve means to afford admission of fluid under pressure to said cylinder, selectively, at opposite ends of said piston to provide for the predetermined reciprocation of said level wind means transversely of said former, and means for driving said former and said timing means.

4. In tire bead building apparatus including a rotatable former and level wind means for laying tire bead material in successive turns transversely on said former, the combination of pump means affording a source of fluid under pressure, motor means defined by a piston and cylinder, said piston having connection with said level wind means for reciprocating the latter transversely of said former, control means including valve means between said pump means and said piston and cylinder means for selectively controlling flow of fluid under pressure from said pump means to said cylinder at opposite ends of said piston, timing means drivingly connected with said former and operative in predetermined timed relation with rotation of the latter for controlling said valve means to afford for admission of fluid under pressure to said cylinder, selectively, at opposite ends of said piston to provide for the predetermined reciprocation of said level wind means transversely of said former, means for driving said former and said timing means, second control means connected with said motor means adapted when actuated to terminate flow of fluid under pressure to said cylinder, and said timing means including means for actuating said second control means.

5. In tire bead building apparatus including a rotatable former and level wind means for laying tire bead material in successive turns transversely on said former, the combination of pump means affording a source of fluid under pressure, motor means defined by a piston and cylinder, said piston having connection with said level wind means for reciprocating the latter transversely of said former, control means including valve means between said pump means and said piston and cylinder means for selectively controlling flow of fluid under pressure from said pump means to said cylinder at opposite ends of said piston, timing means drivingly connected with said former and operative in predetermined timed relation with rotation of the latter for controlling said valve means to afford for admission of fluid under pressure to said cylinder, selectively, at opposite ends of said piston to provide for the predetermined reciprocation of said level wind means transversely of said former, means for driving said former and said timing means, second control means between said pump means and said motor means adapted when actuated to render said pump means inoperative and for establishing fluid connection between the ends of said cylinder at opposite ends of said piston, said timing means including means for actuating said second control means, and positioning means mounted adjacent said level wind means for engaging and disposing the latter in a predetermined position relative to said former after actuation of said second control means.

6. In tire bead building apparatus including a rotatable former and level wind means for laying bead material in successive turns transversely on said former, the combination of pump means affording a source of fluid under pressure, motor means defined by a piston and cylinder, said piston having connection with said level wind means for reciprocating the latter transversely of said former, valve means between said pump means and said cylinder, said valve means having a first position for admitting fluid under pressure to said cylinder at one end of said piston and exhausting said cylinder at the other end of said piston, and a second position for admitting fluid under pressure to said cylinder at said other end of said piston and exhausting said cylinder at said one end of said piston, control means connected with said valve means to dispose the latter, selectively, in its first and second positions, timing means including movable means drivingly connected with said former and operative in predetermined timed relation with rotation of the latter for engaging said movable means with said control means to provide for actuation of said valve means alternately between its said first and second positions to afford for admission of fluid under pressure to said cylinder, selectively, to reciprocate said piston therein and provide for reciprocation of said level wind means transversely of said former, and means for driving said former and said timing means.

7. In tire bead building apparatus including a rotatable former and level wind means for laying bead material in successive turns transversely on said former, the combination of pump means affording a source of fluid under pressure, motor means defined by a piston and cylinder, said piston having connection with said level wind means for reciprocating the latter transversely of said former, valve means between said pump means and said cylinder, said valve means having a first position for admitting fluid under pressure to said cylinder at one end of said piston and exhausting said cylinder at the other end of said piston, and a second position for admitting fluid under pressure to said cylinder at said other end of said piston and exhausting said cylinder at said one end of said piston, control means connected with said valve means to dispose the latter, selectively, in its first and second positions, timing means including movable means drivingly connected with said former and operative in predetermined timed relation with rotation of the latter for engaging said movable means with said control means to provide for actuation of said valve means alternately between its first and second positions to afford for admission of fluid under pressure to said cylinder to reciprocate said piston therein and provide for reciprocation of said level wind means transversely of said former, means for driving said former and said timing means, second control means between said pump means and said motor means adapted when actuated to render said pump means inoperative and for establishing fluid connection between the ends of said cylinder at opposite ends of said piston, and said timing means including means for actuating said second control means.

8. In tire bead building apparatus including a rotatable former and level wind means for laying bead material in successive turns transversely on said former, the combination of pump means affording a source of fluid under pressure, motor means defined by a piston and cylinder, said piston having connection with said level wind means for reciprocating the latter tranversely of said former, valve means between said pump means and said cylinder, said valve means having a first position for admitting fluid under pressure to said cylinder at one end of said piston and exhausting said cylinder at the other end of said piston, and a second position for admitting fluid under pressure to said cylinder at said other end of said piston and exhausting said cylinder at said one end of said piston, control means connected with said valve means to dispose the latter, selectively, in its first and second positions, timing means including movable means drivingly connected with said former and operative in predetermined timed relation with rotation of the latter for engaging said movable means with said control means to provide for actuation of said valve means alternately between its first and second positions to afford for admission of fluid under pressure to said cylinder to reciprocate said piston therein and provide for reciprocation of said level wind means transversely of said former, means for driving said former and said timing means, second control means between said pump means and said motor means adapted when actuated to render said pump means inoperative and for establishing fluid connection between the ends of said cylinder at opposite ends of said piston, said timing means including means for actuating said second control means, and positioning means mounted adjacent said lever wind means for engaging and disposing the latter in a predetermined position relative to said former after actuation of said second control.

9. In tire bead building apparatus including a rotatable former and level wind means for laying bead material in successive turns transversely on said former, the combination of pump means affording a source of fluid under pressure, motor means defined by a piston and cylinder, said piston having connection with said level wind means for reciprocating the latter transversely of said former, valve means between said pump means and said cylinder, said valve means having a first position for admitting fluid under pressure to said cylinder at one end of said piston and exhausting said cylinder at the other end of said piston, and a second position for admitting fluid under pressure to said cylinder at said other end of said piston and exhausting said cylinder at said other end of said piston, electrically operable control means connected with said valve means including switch means for alternately disposing said valve means in its said first and second positions to reciprocate said piston in said cylinder, timing means including chain means drivingly connected in timed relation with said former, switch engaging members carried by said chain means, and said switch engaging members actuating said switch means upon movement of said chain means to provide for reciprocation of said level wind means transversely of said former, and means for driving said former and said timing means.

10. In tire bead building apparatus the combination of a rotatable former, drive means for rotating said former, level wind means for laying bead material in successive turns transversely on said former, pump means driven with said former and affording a source of fluid under pressure, motor means defined by a piston and cylinder, said piston having connection with said level wind means for reciprocating the latter, valve means between said pump means and said cylinder, said valve means having a first position for admitting fluid under pressure from said pump means to said cylinder at one end of said piston and exhausting said cylinder at the other end of said piston, and a second position for admitting fluid under pressure from said pump means to said cylinder at said other end of said piston and exhausting said cylinder at said one end of said piston, electrically operable control means connected with said valve means and including switch means for alternately disposing said valve means in its said first and second positions to reciprocate said piston in said cylinder, timing means including chain means drivingly connected in timed relation with said former, switch engaging members carried by said chain means, said switch engaging members actuating said switch means upon movement of said chain means to provide for reciprocation of said level wind means transversely of said former, electrically operable second control means for controlling energization of said drive means and including bypass means connected with said cylinder for establishing fluid connection between the ends of said cylinder at opposite ends of said piston, switch means for said second control means, and said timing means including means for actuating said last named switch means.

11. In tire bead building apparatus the combination of a rotatable former, drive means for rotating said former, level wind means for laying bead material in successive turns transversely on said former, pump means driven with said former and affording a source of fluid under pressure, motor means defined by a piston and cylinder, said piston having connection with said level wind means, valve means between said pump means and said cylinder, said valve means having a first position for admitting fluid under pressure from said pump means to said cylinder at one end of said piston and exhausting said cylinder at the other end of said piston, and a second position for admitting fluid under pressure from said pump means to said cylinder at said other end of said piston and exhausting said cylinder at said one end of said piston, electrically operable control means connected with said valve means and including switch means for alternately disposing said valve means in its said first and second positions to reciprocate said piston in said cylinder, timing means including chain means drivingly connected in timed relation with said former, switch engaging members carried by said chain means, said switch engaging members actuating said switch means upon movement of said chain means to provide for reciprocation of said level wind means transversely of said former, second electrically operable control means for controlling energization of said drive means and including bypass means connected with said cylinder for establishing a bypass fluid connection between the ends of said cylinder at opposite ends of said piston, switch means for and connected with said second electrically operable control means, said timing means including means for actuating said last named switch means for rendering said drive means inoperable to terminate driving of said former and said pump means and to establish said bypass fluid connection, and positioning means mounted adjacent said level wind means for selectively engaging and disposing the latter in predetermined position transversely relative to said former after actuation of said second electrically operable control means.

References Cited in the file of this patent

UNITED STATES PATENTS

| | | |
|---|---|---|
| 2,083,350 | Shook | June 8, 1937 |
| 2,151,306 | Shook | Mar. 21, 1939 |
| 2,278,533 | Desautels | Apr. 7, 1942 |
| 2,555,343 | Jones | June 5, 1951 |
| 2,609,320 | Modigliani | Sept. 2, 1952 |
| 2,757,884 | Bryant et al. | Aug. 7, 1956 |
| 2,884,988 | D'Angelo | May 5, 1959 |

FOREIGN PATENTS

| | | |
|---|---|---|
| 771,403 | Great Britain | Apr. 3, 1957 |